United States Patent
Fulmer

[15] 3,677,002
[45] July 18, 1972

[54] SUBSIDIARY SUPPLY FOR HYDRAULIC BRAKE BOOSTER

[72] Inventor: Keith H. Fulmer, South Bend, Ind.
[73] Assignee: The Bendix Corporation
[22] Filed: Feb. 4, 1971
[21] Appl. No.: 112,524

[52] U.S. Cl..............................60/52 B, 60/52 S, 60/54.6 E, 60/54.6 P, 60/6
[51] Int. Cl......................................................F15b 15/18
[58] Field of Search.................60/52 B, 52 S, 54.5 E, 54.6 E, 60/54.5 P

[56] References Cited

UNITED STATES PATENTS

| | | | |
|---|---|---|---|
| 1,890,010 | 12/1932 | Vickers | 60/52 B |
| 2,183,421 | 12/1939 | Brady | 60/60 UX |
| 2,323,519 | 7/1943 | Dean | 60/60 UX |
| 3,170,536 | 2/1965 | Van House et al | 60/52 S X |

*Primary Examiner*—Edgar W. Geoghegan
*Attorney*—Ken C. Decker and Plante, Hartz, Smith and Thompson

[57] ABSTRACT

A vehicle brake applying mechanism which utilizes a dual source of fluid under pressure to assist the vehicle operator in slowing or stopping the vehicle. The mechanism includes a hydraulic brake booster comprising an operator controlled piston slidably located in a housing for movement at the will of the operator, through the manipulation of valve means to thereby establish a braking force in a master cylinder to which the piston is connected. Under normal conditions the brake booster receives its main source of fluid under pressure from an engine-driven pump which also supplies fluid to the vehicle's steering gear. However, an independent subsidiary source of fluid under pressure is supplied to the booster should the main source of fluid reach a predetermined minimum value. The subsidiary source is activated or rendered effective by a low flow sensitive switch located in the main supply for energizing an electric pump which is in communication with the booster piston via the valve means. The subsidiary source also actuates a shut-off valve interposed between the booster and steering gear to disestablish flow to the gear, thus conserving the subsidiary source for booster use only.

10 Claims, 2 Drawing Figures

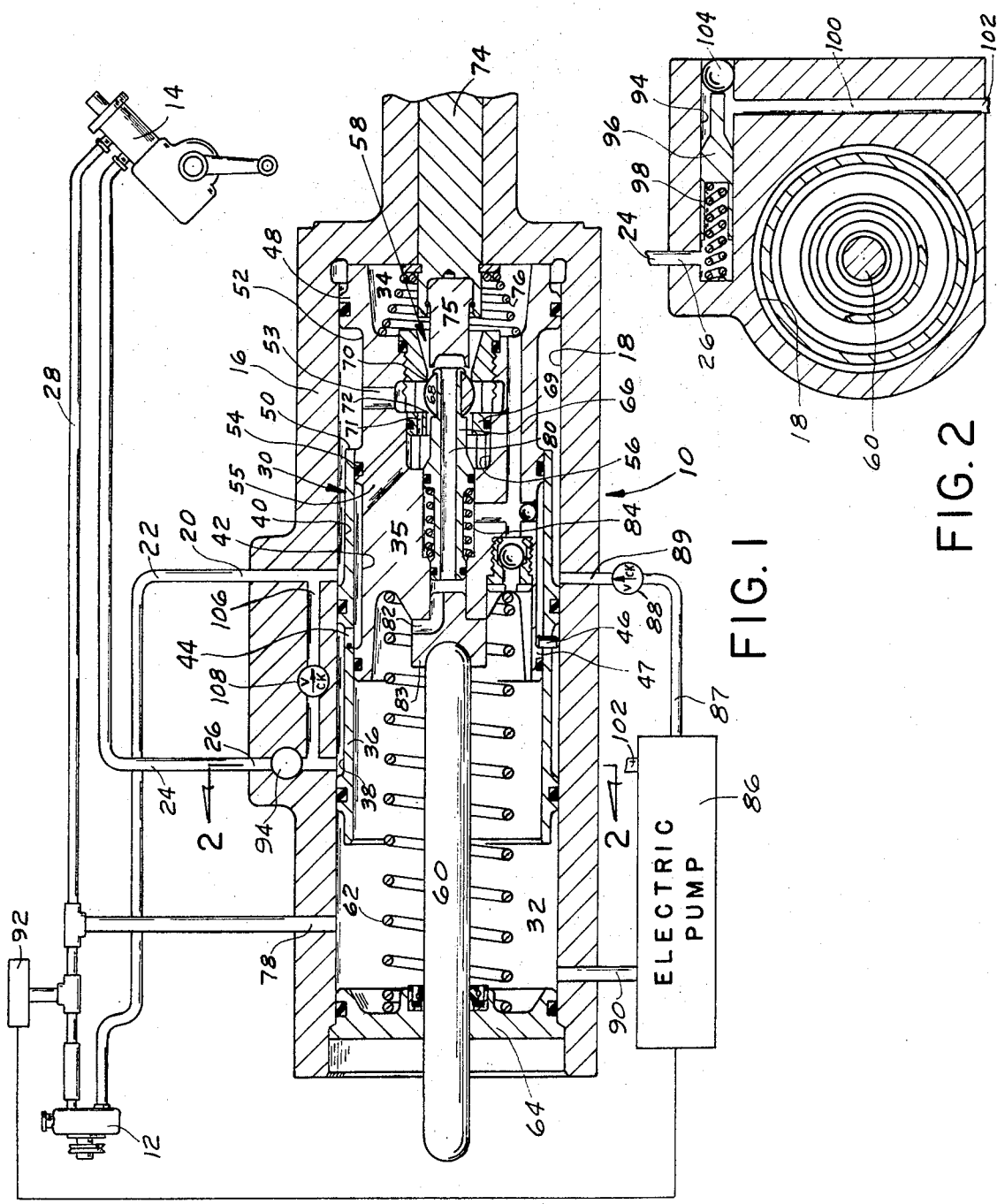

SUBSIDIARY SUPPLY FOR HYDRAULIC BRAKE BOOSTER

BACKGROUND OF THE INVENTION

The invention concerns a vehicle fluid pressure system having a fluid operated brake booster therein for converting a manual input force into an amplified output force, and more specifically a booster which is provided with a subsidiary source of fluid pressure for actuating the master cylinder of a hydraulic braking system at times when the main fluid pressure source communicating with said booster is inadequate to achieve vehicle braking.

A booster of the aforementioned type employing two such sources of fluid pressure but utilizing different valve construction for controlling the respective fluid pressure sources is shown in U.S. Pat. Application Ser. No. 73,933, filed Sept. 21, 1970, owned by the assignee of the present invention. The present invention relates to improvements in the utilization of two fluid pressure sources used in connection with a fluid operated brake booster, thereby minimizing the danger due to the loss of brakes in the event the main fluid pressure source fails.

SUMMARY OF THE INVENTION

In view of the foregoing, an important object of my invention is to provide in a vehicle hydraulic system, a hydraulic boost mechanism having a subsidiary source of fluid available in the event the main source of fluid reaches a predetermined minimum flow as sensed in the main source return line.

Another important object of my invention is to provide in a vehicle hydraulic system, including a hydraulic boost mechanism and a steering gear, a subsidiary source of fluid for operating said boost mechanism only, should the main source of fluid which supplies the vehicle hydraulic system diminish to some predetermined minimum value.

The above and other objects and features of the present invention will become apparent from the following description taken in connection with accompanying drawing.

DESCRIPTION OF THE DRAWINGS

FIG. 1 is a view, partially in section, of a hydraulic boost mechanism constructed in accordance with the invention which is disclosed in association with other elements of the vehicle hydraulic system illustrated schematically; and FIG. 2 is a cross-sectional view of the boost mechanism taken along the line 2—2 of FIG. 1.

DETAIL DESCRIPTION

Referring now to FIG. 1, the reference numeral 10 designates a hydraulic boost mechanism located in a vehicle hydraulic system comprising an engine driven pump 12 and a steering gear 14 operatively connected to the vehicle wheels in a manner well known to those skilled in the art. The boost mechanism 10, which may be termed more specifically a hydraulic brake booster, includes a housing 16 provided with a bore 18. The brake booster housing 16 is equipped with an inlet port 20 which is in fluid communication with a main hydraulic source of fluid from the pump 12 through conduit 22. A conduit 24 connects working port 26 in the housing 16 to the device 14, which in this particular system is a steering gear. A return line 28 carries the return fluid from the gear 14 to the pump 12 for recirculation.

Piston means 30 is reciprocally located in the bore 18 of the housing 16, dividing said bore into two chambers 32 and 34 at the respective ends of said piston means. The piston means includes a piston 35 and a sleeve 36, the latter of which is formed with circumferential grooves or recesses 38 and 40 which maintain registry with the working port 26 and inlet port 20, respectively, during movement of the piston means in said bore. The piston is also formed with a circumferential groove or recess 42 communicating with groove 38 at all times through passage 44 in the sleeve 36. A pin 46, located in the sleeve, projects into the groove 42 for engagement with the land 47 to restrict the longitudinal separation between the sleeve and piston. Telescoping of the piston 35 within the sleeve 36 is controlled by engagement between land 48 of the piston and end 50 of the sleeve. It is noted that groove 42 maintains communication with passage 44 during the telescoping action between the piston and the sleeve. The piston 35 is further formed with a circumferential groove 52 between the lands 48 and 51, the latter of which is provided with a seal 54 which prevents leakage between the grooves 42 and 52. As is commonly known to those skilled in the art, the other lands formed on the sleeve and piston are likewise equipped with the necessary seals. Located within a central cavity or recess 56 of the piston 35 is valve means 58 for controlling reciprocation of said piston 35 in actuating a brake master cylinder, not shown, through a force transmitting rod 60, in a manner well known to those skilled in the art. A spring 62 is interposed between an end closure 64 and one end of the piston 35 to normally urge the piston to the right end of the bore, as viewed in the drawing.

The valve means 58 is of the so-called open-center type which allows the pump 12 to freely circulate fluid through the brake booster 10 to the steering gear in the absence of vehicle braking. In this position fluid flows from the inlet port 20 to the working port 26 by way of recesses 40 and 52, radial passage 53, between seat 72 and the valve element 68, passage 55, recess 42, passage 44 and recess 38. The valve means comprises a tubular valve member 66 on one end of which is carried a valve element 68 for engagement with valve seats 70 and 72 respectively, depending on whether the brake booster is unapplied (as shown) or applied. In the latter case, the valve member is unseated from seat 70 and seated on seat 72. Valve seat 72 is formed on a ring element 69 having axial passage 71 to maintain fluid flow to said steering gear 14 during brake boost actuation when the valve element 68 bears against the seat 72. These passages 71 act as a by-pass for valve member 66 when seated on seat 72 to insure an adequate supply of fluid to the device 14. In the brake booster applying position, the operator pushes on thrust member 74 urging it together with valve member 75 into seating relationship with valve element 68. Further movement of the thrust member unseats the element 68 to communicate the chamber 34 with the inlet 20. Fluid from the inlet port enters the passage 53 and passes between the seat 70 and valve element 68 of valve member 66, into chamber 34 where the fluid acts on the right end of the piston 35 urging it leftward, as viewed in the drawing. Upon removal of the force applied to thrust member 74, a spring 76 lifts the valve member 75 off valve member 68, thereby communicating the chamber 34 with outlet port 78, which connects the chamber 32 with the engine pump 12 inlet. Communication between the chambers 32 and 34 is through a passage 80 of the tubular valve member 66 and passage 82 in the central boss 83 of the piston 35. A spring 84 is located in the central cavity 56 of the piston for urging the valve member 66 to the right, as viewed in FIG. 1, to cause the valve element 68 to rest against seat 70, cutting off communication between the chamber 34 and the inlet port 20.

Under normal conditions of operation, the engine driven pump 12, considered to be the main source of fluid, supplies sufficient fluid under pressure to successfully operate the power brake boost and the steering gear 14, independently or concurrently. However, should the pump 12 malfunction or should the pump fail to furnish an adequate supply of fluid to the vehicle hydraulic system at a time when needed, an extremely dangerous situation would prevail. Either the brake booster 10 or the device 14, or both, could be rendered inoperable hydraulically. Of course, both could be operated manually, but this is sometimes difficult for a woman. To minimize the likelihood of losing power for operating the brake booster 10, a second or subsidiary hydraulic source is made available when the fluid from the first or main source reaches a predetermined minimum flow.

The subsidiary hydraulic source is obtained from an electric pump 86 having its outlet connected through a line 87 and check valve 88 with inlet port 89 in the housing 16. The inlet port 89 communicates with the bore 18 and recesses 40 and 52, respectively, of the sleeve 36 and piston 35. A conduit 90 communicates the inlet side of the pump 86 with the chamber 32 of the boost mechanism 10. Since the pump 86, or subsidiary source, is to be effectuated or brought into operation only if the main source falls to some low flow value, a flow sensitive switching device 92 is located in the line 28 to sense such low flow and actuate the electric pump 86. Since the electric pump 86 functions only in emergencies as a subsidiary or auxiliary to the engine driven pump 12 to furnish fluid only to the brake booster, the pump capacity of pump 86 is small compared to pump 12 and is not such that it can supply fluid to the steering gear too.

With reference to FIG. 2, it will be observed that the housing 16 is provided with a drilled passage 94, intersecting the working port 26. A plunger 96, responsive to effectuation of said second source, is slidably received in said passage 94 to interrupt communication between said device and the bore 18. A spring 98 urges the plunger to the right, as viewed in FIG. 2, to permit free flow of fluid from the bore 18 to the device 14 as long as the first or main hydraulic source is maintaining the fluid requirements of the system. A passageway 100 in the housing communicates the back side of a shut-off valve or plunger 96 with the outlet of the electric pump 86 through pipe 102. A spherical plug 104 closes the end of the drilled passage 94. As shown in FIG. 1, fluid shunt connection 106 and a check valve 108 provide communication between the working port 26 and the cavity in the bore adjacent recesses 40 and 52 to allow for circulation of fluid in an otherwise closed fluid circuit due to the action of the shutoff valve 96 cutting out device 14. The check valve 108 acts to equalize the pressures between the cavities formed by the recesses 38 and 40 and the bore 18. The electric pump 86 is provided with its own internal by-pass device, not shown, from the outlet to the inlet to permit recirculation of the fluid should the pressure head at the outlet of the pump 86 reach a predetermined high value.

MODE OF OPERATION

Assuming that the pump 12 is operating properly, i.e., the main source of fluid is adequate, fluid circulates freely through the inlet port 20, recesses 40 and 52, passage 53, the opening between valve seat 72 and valve member 68, passage 55, recess 42, passage 44, recess 38, working port 26, steering gear 14, and back to pump 12. Operation of the brake booster 10 at this time seats the valve member 75 on the valve member 68, to first cut off the chamber 34 from outlet port 78, via the tubular member 66. Continued movement of the members 74 and 75 unseats the valve 68 from the seat 70, thus connecting the chamber 34 to the main fluid pressure source in communication with the inlet port 20. Further movement of the members 74 and 75 seats the valve 68 on seat 72. At this moment the chamber 34 is exposed to the full main pressure source, except that which is by-passed through the axial passages 71 to provide fluid for operation of the gear 14. This moves the piston 35 to the left to thereby act on the force transmitting rod 60 to activate a brake master cylinder in a well-known manner. Release of applying force from the thrust member 74, returns the piston means 30 and valve means 58 to the present positions, as shown.

In the event that there is an insufficient supply of fluid from the main source, at a time when the brake booster is being operated, this deficiency will be sensed by the flow sensitive device 92 which actuates the electrical pump 86. This effectuates a subsidiary source of fluid which is ample for operating the brake booster alone. The pump 86, which is connected to the inlet port 89 of the booster, communicates with recesses 40 and 52, passage 53, the opening between valve seat 72 and valve member 68, passage 55, recess 42, passage 44, recess 38 and working port 26. These are the same recesses and passages with which the main fluid source communicates. However, the subsidiary source from the pump 86 also acts through conduit 102 and passage 100 on the valve member 96 to shut off communication between the working port 26 and the rest of the vehicle hydraulic system, including the steering gear 14. This means that a much lower capacity pump can be used for the subsidiary source since only the brake booster is controlled by the second source, with the steering gear out of the hydraulic circuit. When operating under the second or subsidiary source of fluid, circulation within the piston means and valve means occurs through the shunt path 106 which connects the recesses 38 and 40 of the sleeve 36. Manipulation of the brake booster is the same irrespective of which of the sources is used.

What is claimed is:

1. In a vehicle hydraulic system:
   a hydraulic boost mechanism and a hydraulic device;
   said boost mechanism including a housing forming a bore in which piston means is slidably received;
   a first hydraulic source in fluid communication with said device via said bore;
   a second hydraulic source normally ineffective and in fluid communication with said bore;
   operator-operated valve means for controlling the application of said first and second hydraulic sources to said piston means to cause it to reciprocate in said bore;
   means responsive to a predetermined minimum flow through said first source for effectuating said second source;
   second valve means within said housing responsive to the effectuation of said second source for interrupting communication between said device and said bore, to thereby conserve the second source solely for actuation of said boost mechanism.

2. The combination, as recited in claim 1, wherein said hydraulic device is a steering gear connected hydraulically in series flow relationship to said hydraulic boost mechanism.

3. In a vehicle hydraulic system, as defined in claim 1, wherein said first hydraulic source is a pump driven from the engine of the vehicle, and the second hydraulic source is an electric pump.

4. In a vehicle hydraulic system, as defined in claim 1, wherein said operator-operated valve means comprises an open-center valve which permits free flow of fluid from said engine driven pump through said boost mechanism from the inlet port to the working port, thence to the steering gear, and back to the pump.

5. The combination, as defined in claim 4, wherein a fluid shunt is connected from said working port to said inlet port to by-pass fluid away from said working port and return it to said inlet port to be recirculated.

6. In a vehicle hydraulic system, as defined in claim 4, characterized in that said operator-operated valve means is located concentrically within said piston means.

7. The invention of claim 1:
   conduit means communicating said bore with said device;
   second valve means within said conduit means for controlling fluid communication therethrough; and
   means communicating said second valve means with said second hydraulic source, said second valve means shifting to a position blocking flow of fluid through said conduit means when fluid from said second source is communicated to said second valve means.

8. In a hydraulic boost mechanism:
   a housing provided with a bore; piston means reciprocable in said bore and dividing said bore into two chambers, located at the respective ends of said piston means;
   two inlet ports, two outlet ports and a working port in communication with said bore;
   one of said inlet ports, one of said outlet ports and said working port are connectible to a main fluid source;
   the other of said inlet ports and the other of said outlet ports are connectible to a subsidiary fluid source;

operator-operated valve means slidably positioned within said piston means for controlling fluid flow between said ports and said chambers;

means responsive to a predetermined minimum fluid flow through said working port for establishing fluid flow at the other of said inlet ports; and means in said housing responsive to fluid under pressure at the other of said inlet ports for interrupting fluid flow from said working port;

said last-named means including a slide valve which is closed by the fluid pressure at the other of said inlet ports and opened under the influence of a spring.

9. The hydraulic boost, as defined in claim 8, wherein said valve means includes an open-center valve which permits free flow of fluid between said one of said inlet ports and said working port during an unapplied condition of the boost mechanism.

10. The hydraulic boost, as defined in claim 8, wherein said flow responsive means comprises a flow sensitive device operatively connected to an electric pump which is in fluid pressure communication with the other of said inlet ports.

* * * * *